(12) United States Patent
Holzleitner

(10) Patent No.: US 10,693,684 B1
(45) Date of Patent: Jun. 23, 2020

(54) SYMBOL RATE DETERMINATION METHOD AND MEASUREMENT INSTRUMENT

(71) Applicant: Rohde & Schwarz GmbH & Co. KG, Munich (DE)

(72) Inventor: Christoph Holzleitner, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/353,980

(22) Filed: Mar. 14, 2019

(51) Int. Cl.
*H03K 9/08* (2006.01)
*H04B 3/46* (2015.01)
*H04L 25/02* (2006.01)

(52) U.S. Cl.
CPC ........ *H04L 25/0262* (2013.01); *H04L 25/022* (2013.01); *H04L 25/0216* (2013.01); *H04L 25/0222* (2013.01)

(58) Field of Classification Search
CPC ...... G01R 27/28; G01R 29/02; G01R 29/023; G01R 29/033; G01R 23/16; G01R 19/16585; G01R 23/15; G01R 29/0273; H04L 25/0262; H04L 25/4902
See application file for complete search history.

(56) References Cited

U.S. PATENT DOCUMENTS

| | | | | |
|---|---|---|---|---|
| 4,562,549 A * | 12/1985 | Tanaka | ............... | G01R 29/0273 327/100 |
| 5,222,028 A * | 6/1993 | LaBarre | ............... | G01R 29/02 324/76.12 |
| 5,475,312 A * | 12/1995 | Sedding | ............... | G01R 31/12 324/536 |
| 7,061,979 B1 * | 6/2006 | Chin | ............... | G01R 23/09 329/312 |
| 7,437,624 B2 | 10/2008 | Miller et al. | | |
| 9,795,794 B2 * | 10/2017 | Baumgartner | ..... | A61N 1/37211 |
| 2009/0192740 A1 * | 7/2009 | Rule | ............... | G01R 13/0245 702/68 |
| 2011/0096881 A1 | 4/2011 | Villarino-Villa et al. | | |
| 2011/0229152 A1 * | 9/2011 | Hara | ............... | H04L 25/0262 398/202 |
| 2012/0191393 A1 * | 7/2012 | Satou | ............... | G01R 23/155 702/78 |
| 2012/0234928 A1 * | 9/2012 | Pebay-Peyroula | ............... | G06K 7/0008 235/492 |
| 2014/0321301 A1 * | 10/2014 | Hokari | ............... | H04L 25/0262 370/252 |

FOREIGN PATENT DOCUMENTS

EP 1172962 A2 1/2002

* cited by examiner

*Primary Examiner* — Aristocratis Fotakis
(74) *Attorney, Agent, or Firm* — Christensen O'Connor Johnson Kindness PLLC

(57) ABSTRACT

A symbol rate determination method for determining a symbol rate of an input signal is disclosed. The method comprises: receiving the input signal; determining respective pulse widths of pulses contained in the input signal; allocating the pulse widths to groups based on a magnitude of the respective pulse widths; determining a group pulse width for each of the groups, the group pulse width being representative of the pulse widths contained in the respective group; and determining the symbol rate based on the determined group pulse widths. Moreover, a measurement instrument for determining a symbol rate of an input signal is disclosed.

18 Claims, 2 Drawing Sheets

SYMBOL RATE DETERMINATION METHOD AND MEASUREMENT INSTRUMENT

FIELD OF THE DISCLOSURE

Embodiments of the present disclosure relate generally to a symbol rate determination method for determining a symbol rate of an input signal. Further, embodiments of the present disclosure generally relate to a measurement instrument for determining a symbol rate of an input signal.

BACKGROUND

Several transmission protocols, particularly transmission protocols for high data rates, do not have a dedicated clock signal. Thus, when receiving a signal that is based on such a transmission protocol, the duration of individual symbols contained in the signal and, therefore, the symbol rate is also not known. Accordingly, this information needs to be retrieved based on the signal itself.

Known methods for determining the symbol rate usually need an estimated starting value for the symbol rate in order to determine the symbol rate. However, these methods suffer from the problem that the determined symbol rate may be far off from the real value of the symbol rate if the estimate is too far off from the real value of the symbol rate.

Accordingly, there is a need for a symbol rate determination method as well as an measurement instrument that are capable of reliably determining the symbol rate of an input signal.

SUMMARY

Embodiments of the present disclosure provide a symbol rate determination method for determining a symbol rate of an input signal. The symbol rate determination method comprises in some embodiments the following steps:

receiving the input signal;

determining respective pulse widths of pulses contained in the input signal;

allocating the pulse widths to groups based on a magnitude of the respective pulse widths;

determining a group pulse width for each of the groups, the group pulse width being representative of the pulse widths contained in the respective group; and determining the symbol rate based on the determined group pulse widths.

Thus, the symbol rate determination method according to the present disclosure does not need an estimated symbol rate as input in order to be able to determine the symbol rate. Instead, the symbol determination method according to the disclosure is based on the idea to determine the different pulse widths contained in the input signal, for example all different pulse widths contained in the input signal, and then to determine the symbol rate based on these determined pulse widths.

In other words, the symbol rate can be determined solely based on the input signal without a need for any further input or estimate, for example without an estimate of the symbol rate.

Moreover, as several different pulse widths are taken into account, for example all different pulse widths contained in the input signal, the accuracy of the determined symbol rate is enhanced.

Therein and in the following, the pulse width is understood to be measured in units of a so-called unit interval, which is the minimal duration of a pulse and thus basically equal to the symbol duration, which is the inverse of the symbol rate.

According to one aspect of the present disclosure, alone or in combination with any other aspect, the smallest one of the determined group pulse widths is compared to the remaining group pulse widths determined in order to determine the symbol rate. In some embodiments, the magnitudes of the smallest one of the determined group pulse widths is compared to the respective magnitude of the remaining group pulse widths.

According to a further aspect, alone or in combination with any other aspect, a ratio of the smallest group pulse width and at least one of the remaining group pulse widths is determined, wherein it is determined whether the ratio is equal to an integer within a predefined error margin. In other words, it is determined whether the remaining group pulse widths each are, at least approximately, an integer multiple of the smallest one of the group pulse widths. As all pulse widths that correspond to actual symbols have to be approximate multiples of the unit interval, this is a strong indication that the smallest group pulse width corresponds to the unit interval. Then, several of the group pulse widths or even all the group pulse widths may be used to determine the symbol rate.

In some embodiments, the predefined error margin may be equal to 15%, for instance equal to 10%, for instance equal to 5% or even smaller.

In a further embodiment of the present disclosure, the smallest group pulse width is divided by an integer number bigger than one if the ratio is a non-integer number, thereby obtaining a divided group pulse width, and wherein the divided group pulse width is compared to the remaining group pulse widths in order to determine the symbol rate. The integer number may be equal to 2. Alternatively, the integer number may be bigger than 2, for example equal to 3, 4, 5, 6 or even larger. Then, the steps described above are repeated with the divided smallest group pulse width instead of the smallest group pulse width. This approach is particularly useful, if no pulse with a length equal to the unit interval is contained in the measured set of pulses in the input signal.

These steps may be repeated if the remaining group pulse widths are still not an (approximate) integer multiple of the divided group pulse width. This way, the pulse widths contained in the input signal can be used to incrementally retrieve the unit interval.

Alternatively or additionally, a coverage coefficient may be determined to be the quotient of a number of pulses whose allocated ratio is an integer and an overall number of pulses, wherein the symbol rate is determined based on the group pulse widths if the coverage coefficient is bigger than a predefined threshold. Thus, the coverage coefficient gives an indication of the proportion of pulse widths being an integer multiple of the smallest one of the group pulse widths and therefore of the validity of the current smallest group pulse width.

If the coverage coefficient is smaller than the predefined threshold, the smallest one of the group pulse widths may be divided by an integer number as described above.

For instance, the predefined threshold is 75%, for example 85%, for example 90% or even 95%.

According to another aspect of the present disclosure, alone or in combination with any other aspect, the pulse widths are determined by determining signal edges in the input signal and by subtracting the associated times of each pair of two consecutive signal edges from each other. Of course, usually the earlier of the respective two times is subtracted from the later one of the two times. But it is also possible to subtract the later time from the earlier time and take the absolute value of the result in order to determine the pulse widths.

The pulse widths of each group may be averaged in order to determine the group pulse width. In some embodiments, an arithmetic average of the pulse widths of the respective group member is taken. Thus, for each of the groups, the respective group pulse width is determined to be the average of the group pulse widths of all group members of the respective group.

In some embodiments, the number of determined pulse widths contained in each of the groups is determined. The number of determined pulse widths contained in each group may also be called the "number of members of each group". The number of members of each group may be saved, for example to a data storage medium, for further use.

According to another embodiment of the disclosure, the group pulse widths are weighted with the respective number of pulse widths contained in the respective group in order to determine the symbol rate. This way, groups with more members also contribute more to the determined symbol rate. This ensures that each determined pulse width contributed equally to the determined symbol rate and that there is no overrepresentation of groups with only few members, for instance erroneous members.

In a particular embodiment of the present disclosure, the determined pulse widths are sorted by size and a moving average of the sorted pulse widths is determined in order to allocate the pulse widths to the groups. Therefore, in every step an average over a predetermined number of the sorted pulse widths is taken. Between each step at least one pulse, namely the one with the lowest pulse width, drops out of the average and at least one new pulse, usually one with a bigger pulse width, is taken into account in the average.

If the value of two consecutively taken averages differs by more than a predetermined value, a new group is generated and the pulse newly taken into account in the moving average is allocated to the new group.

For example, if the value of two consecutively taken averages differs by more than 10%, for example by more than 5%, the new group is started and the pulse newly taken into account in the moving average is allocated to the new group.

A perturbation filter may be applied to the determined pulse widths that discards all pulse widths that are much smaller than the smallest of the group pulse widths. This way, perturbations are filtered out, for example perturbations caused by glitches, idle times and/or small pulse widths caused by a preceding cross-point detection. For example, the perturbation filter may filter out pulses that are at least 25 times smaller, for example at least 50 times smaller or at least 75 times smaller than the smallest of the group pulse widths.

In some embodiments, the input signal is PAM-n coded. Accordingly, the method is not limited to binary signals (PAM-2 coded) since any kind of pulse-amplitude modulated signals may be processed. For instance, the input signal is established as a bit stream, e.g., as a PAM-2 coded signal.

Embodiments of the present disclosure further provide a measurement instrument for determining a symbol rate of an input signal, comprising at least one input channel and an analysis module connected to the at least one input channel. The measurement instrument is configured to receive an input signal via the input channel and to forward the input signal to the analysis module. The analysis module is configured to allocate the pulse widths to groups based on the magnitude of the respective pulse widths. The analysis module is configured to determine a group pulse width for each of the groups, the group pulse width being representative of the pulse widths contained in the respective group. The analysis module is configured to determine the symbol rate based on the determined group pulse widths. Regarding the advantages, reference is made to the explanations given above with respect to the symbol rate determination method, which likewise apply to the measurement instrument according to the disclosure.

In some embodiments, the measurement instrument according to the present disclosure is configured to perform the symbol rate determination method described above.

According to another embodiment of the present disclosure, the analysis module is configured to determine whether a ratio of a smallest of the determined group pulse widths to one or more of the remaining group pulse widths is equal to an integer within a predefined error margin. In other words, the measurement instrument is configured to determine whether the remaining group pulse widths each are, at least approximately, an integer multiple of the smallest one of the group pulse widths. As all pulse widths that correspond to actual symbols have to be approximate multiples of the unit interval, this is a strong indication that the smallest group pulse width corresponds to the unit interval. Then, several of the group pulse widths or even all the group pulse widths may be employed by the measurement instrument in order to determine the symbol rate.

The predefined error margin may be equal to 15%, for example equal to 10%, for instance equal to 5% or even smaller.

According to another aspect of the present disclosure, the analysis module is configured to determine a coverage coefficient, the coverage coefficient being defined as the quotient of a number of pulses whose allocated ratio is an integer and an overall number of pulses, and wherein the analysis module is configured to determine the symbol rate based on the group pulse widths if the coverage coefficient is bigger than a predefined coverage value. Thus, the coverage coefficient gives an indication of the proportion of pulse widths being an integer multiple of the smallest one of the group pulse widths and therefore of the validity of the current smallest group pulse width.

In another embodiment of the present disclosure, the analysis module comprises a filter module being configured to filter out perturbations from the input signal. This way, perturbations are filtered out by the filter module, for example perturbations caused by glitches, idle times and/or small pulse widths caused by a preceding cross-point detection. For example, the perturbation filter may filter out pulses that are at least 25 times smaller, for example at least 50 times smaller or at least 75 times smaller than the smallest of the group pulse widths.

The analysis module can comprise hardware and/or software portions, hardware and/or software modules, etc. In some embodiments, the measurement instrument or analysis module is configured to perform the symbol rate determination methods described and/claimed herein. Some of the method steps may be implemented in hardware and/or in software. In some embodiments, one or more of the method steps may be implemented, for example, only in software. In some embodiments, all of the method steps are implemented, for example, only in software.

According to a further aspect of the present disclosure, the measurement instrument is established as at least one of an oscilloscope, a spectrum analyzer and a vector network analyzer. Thus, an oscilloscope, a spectrum analyzer and/or a vector network analyser may be provided that is enabled to perform the symbol rate determination method described above for determining a symbol rate of an input signal.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
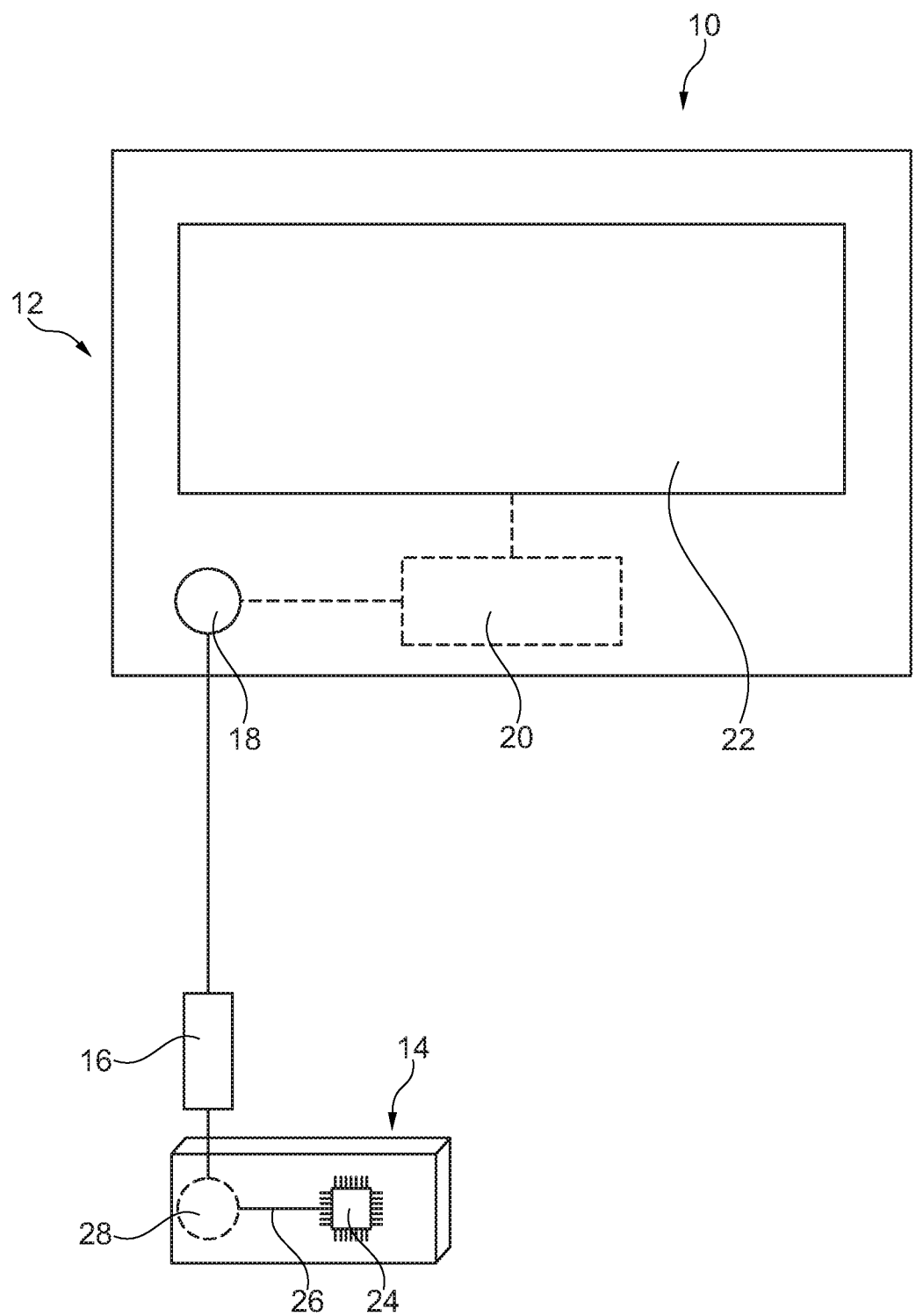
FIG. 1 schematically shows a representative example of a measurement system comprising a measurement instrument according to the present disclosure.

FIG. 1 schematically shows a measurement system 10 comprising a measurement instrument 12 and a device under test 14. The measurement system 10 further comprises a probe 16 that is connected to the measurement instrument 12, for example an input channel 18 of the measurement instrument 12, which further comprises an integrated analysis module 20 and a display 22 that is connected to the analysis module 20. Therefore, the probe 16 is connected to the input channel 18 which in turn is connected to the analysis module 20. The display 22 is connected to the analysis module 20 and/or to the input channel 18 directly.

Typically, a housing is provided that encompasses at least the analysis module 20. In some embodiments, the display 22 is located within the housing, namely a frame of the housing.

Generally, the measurement instrument 12 may be established as an oscilloscope, as a spectrum analyzer, as a vector network analyzer or as any other kind of measurement device being configured to measure certain properties of the device under test 14.

The device under test 14 comprises a signal source 24 as well as a transmission channel 26 connected to the signal source 24. More specifically, the signal source 24 generates an input signal that is transmitted via the transmission channel 26 and probed by the probe 16, for example a tip of the probe 16. For example, the input signal generated by the signal source 24 is forwarded via the transmission channel 26 to a location where the probe 16, for example its tip, can contact the device under test 14 in order to measure the input signal provided by the signal source 24.

Alternatively or additionally, the device under test 14 may comprise an output channel 28 to which the probe 16 may be connectable via a suitable plug. In some embodiments, the probe 16 may be established as a plug that is connectable to the output channel 28.

In general, the measurement instrument 12 receives the input signal via the probe 16 that senses (probes) the input signal. The input signal probed is forwarded to the analysis module 20 via the input channel 18. The input signal is then processed and/or analyzed by the analysis module 20 in order to determine the properties of the device under test 14.

Figure 2:
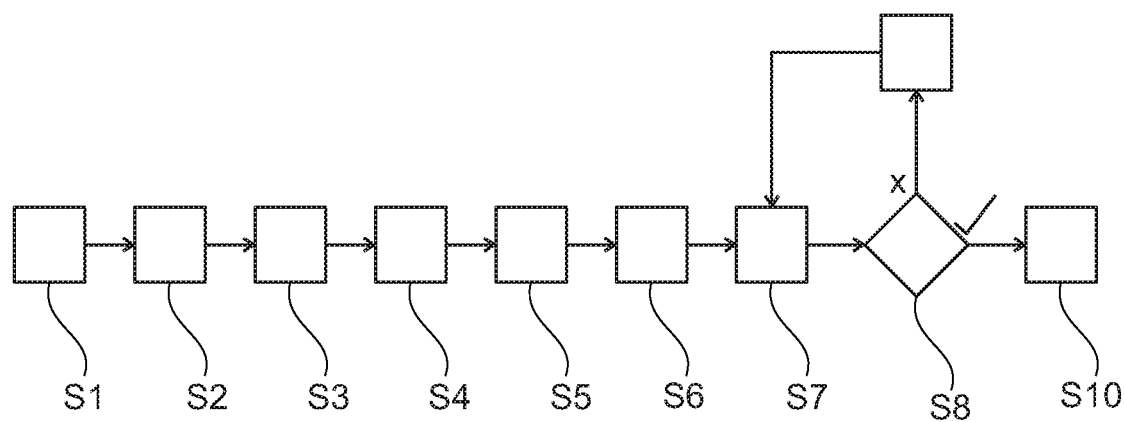
FIG. 2 shows a schematic flow chart of a representative example of a method according to the present disclosure.

In some embodiments, the measurement instrument 12 or rather the analysis module 20 is configured to perform a symbol rate determination method for determining a symbol rate of the input signal, which method is described in the following with reference to FIGS. 2 and 3.

In some embodiments, one or more computer-readable storage media is provided containing computer readable instructions embodied thereon that, when executed by one or more computing devices (contained in or associated with the measurement instrument 12, the analysis module 20, etc.), cause the one or more computing devices to perform one or more steps of the method of FIGS. 2 and 3 described below. In other embodiments, one or more of these method steps can be implemented in digital and/or analog circuitry or the like.

First, the input signal is received by the measurement instrument 12 via the input channel 18 and forwarded to the analysis module 20 (step S1). In general, the input signal is PAM-n coded. Thus, the input signal contains a sequence of symbols having a certain average symbol duration and one of n different signal level values. In some embodiments, the input signal is a PAM-2 coded signal. Then, the symbol sequence contained in the input signal is a bit sequence, i.e. each symbol is a bit having one of two possible values. In the case of a PAM-2 coded signal, the symbol rate determination method described below is a bit rate determination method.

In other words, the input signal comprises a sequence of pulses that each have a certain duration and within which the input signal has a certain value, namely one of the n possible signal level values.

Typically, the duration of each of the pulses is an integer multiple of a so-called unit interval, wherein the unit interval is equal to the time duration of the shortest possible pulse, i.e. equal to the smallest pulse width. This smallest possible pulse width also determines the maximum number of pulses per time interval, i.e. the symbol rate of the input signal.

The analysis module 20 now determines the pulse widths of the pulses contained in the input signal (step S2). Step S2 is illustrated in FIG. 3 in more detail, which shows a schematic diagram of a signal level A of the input signal plotted against time. In order to determine the pulse widths of the individual pulses, the analysis module 20 detects signal edges in the input signal and the respective times at which they occur.

Figure 3:
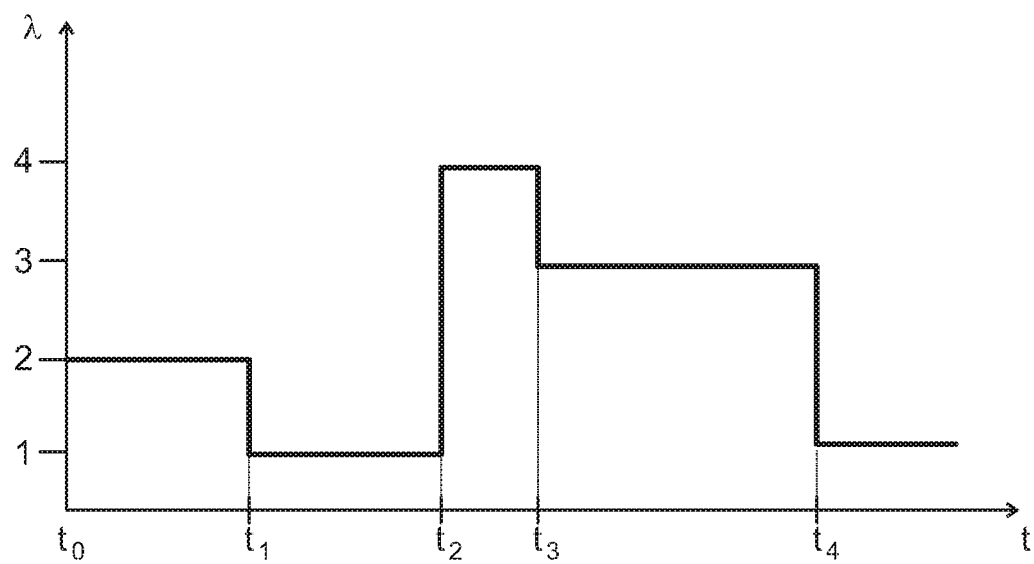
FIG. 3 shows a schematic diagram of an input signal that is processed by the measurement instrument of FIG. 1.

In the example of FIG. 3, there are signal edges at times $t_0$, $t_1$, $t_2$, $t_3$ and $t_4$. The analysis module 20 then determines the pulse widths of the individual pulses by subtracting the associated times of each pair of consecutive signal edges from each other. For example, the pulse width of the first pulse shown in FIG. 3 is determined to be $(t_1-t_0)$, the pulse width of the second pulse is $(t_2-t_1)$, and so forth.

Next, the analysis module 20 sorts the individual pulses by the magnitude of their respective pulse width (step S3). For this purpose, any kind of suitable sorting algorithm may be employed.

Now, the pulses are allocated to groups based on their respective magnitude (step S4). In other words, pulses that are similar with respect to their pulse widths are allocated to the same group. For example, pulses whose corresponding pulse widths differ by less than 50%, for example less than 25%, for example less than 10% or even less than 5%, are allocated to the same group, while pulses whose corresponding pulse width differs by more than that amount are allocated to different groups The pulses are allocated to the groups by taking a moving average of the sorted pulse widths. Therefore, in every step an average over a predetermined number of the sorted pulse widths is taken. Between each step at least one pulse, namely the one with the lowest pulse width, drops out of the average and at least one new pulse, usually one with a bigger pulse width, is taken into account in the average.

If the value of two consecutively taken averages differs by more than a predetermined value, a new group is generated and the pulse newly taken into account in the moving average is allocated to the new group. For example, if the value of two consecutively taken averages differs by more than 10%, for example by more than 5%, the new group is started and the pulse newly taken into account in the moving average is allocated to the new group. Thus, the result of step S4 usually are several groups that each comprise at least one pulse and/or that comprise several pulses.

Now, a group pulse width is determined for each of the groups, wherein the group pulse width is representative of the pulse widths contained in the respective group (step S5). In some embodiments, an average of the pulse widths contained in the respective group is taken in order to determine the respective group pulse width, for example an arithmetic average. Thus, for each of the groups, the respective group pulse width is determined to be the average of the group pulse widths of the group members.

The obtained group pulse widths are then saved together with the respective number of pulses contained in the groups.

Now, a filter may be applied to the group pulse width in order to remove unwanted perturbations (step S6). In some embodiments, the filter may be configured to filter out pulse widths and/or group pulse widths that are much smaller than the next group pulse width and/or pulse width, for example at least 25 times smaller, for example at least 50 times smaller or at least 75 times smaller. This way, perturbations are filtered out, for example perturbations caused by glitches. It should be appreciated that the filter can be implemented in hardware or in software or in a combination of hardware and software.

Now, out of the remaining group pulse widths, the smallest one is taken and compared with the rest of the group pulse widths in order to determine the symbol rate of the input signal (step S7). In step S7, the analysis module 20 determines whether the remaining ones of the group pulse widths respectively are an integer multiple of the smallest group pulse width.

In some embodiments, the analysis module calculates all ratios $R_n = UI_n/UI_0$, wherein $UI_n$ is the group pulse width of the n-th group, with n being an integer, and $UI_0$ is the smallest one of the group pulse widths. Thus, the analysis module calculates whether the ratio $UI_n/UI_0$ is equal to the integer n within a predefined error margin $\Delta_n$, i.e. whether the ratio $R_n$ is in the following interval:

$$R_n = \frac{UI_n}{UI_0} \in [n-\Delta_n; n+\Delta_n].$$

Therein, $\Delta_n$ may be constant, i.e. independent of n, or may have a different value for different n.

$\Delta_n$ may be equal to 15%, for example equal to 10%, for instance equal to 5% or even smaller.

Based on these determined ratios $R_n$, a coverage coefficient $\Lambda$ is determined which is equal to the number of pulses that belong to groups whose group pulse width is, within the predefined error margin, in the interval defined above. More precisely, the coverage coefficient $\Lambda$ is defined as $$\Lambda = \frac{\sum_n \#_n \mid R_n \in [n-\Delta_n; n+\Delta_n]}{N},$$

wherein $\#_n$ is the number of pulse widths contained in group number n, and wherein the sum runs only over such groups that fulfill the condition $R_n \in [n-\Delta_n; n+\Delta_n]$. Moreover, N is the total number of all pulse widths contained in all the groups, i.e. also in the groups not fulfilling $R_n \in [n-\Delta_n; n+\Delta_n]$.

Thus, the coverage coefficient $\Lambda$ gives an indication of the proportion of pulse widths being an integer multiple of the smallest one of the group pulse widths.

Now, the analysis unit 20 determines whether the coverage coefficient $\Lambda$ is bigger than a predefined threshold (step S8). For instance, the predefined threshold is 75%, for example 85%, for example 90% or even 95%. If the coverage coefficient $\Lambda$ is smaller than the predefined threshold, the smallest one of the group pulse widths $UI_0$ is divided by an integer number k that is bigger than 1, for example divided by 2 (step S9), thereby generating a divided smallest group pulse width $UI'_0 = UI_0/k$.

Then, the steps S7 and S8 described above are repeated with the divided smallest group pulse $UI'_0$ instead of the smallest group pulse width $UI_0$. If the coverage coefficient is still smaller than the predefined threshold, also step S9 is repeated and the divided smallest group pulse width $UI'_0$ is once again divided by the integer k, for example divided by 2.

Alternatively, the divided group pulse width $UI'_0$ may be divided by another integer that is different from k. Alternatively, the original smallest group pulse width $UI_0$ may be divided by another integer that is different from k.

This loop, i.e. steps S7 to S9, may be repeated several times, for example up to ten times or more. If the coverage coefficient then is still below the predefined threshold, the determination of the symbol rate may be aborted and/or an error message may be displayed on the display 22. Alternatively, the predefined error margin $\Delta_n$ may be raised, for example to 10% or to 15%, and steps S7 and S8 are repeated with the raised error margin.

If the coverage coefficient then still is below the predefined threshold, the predefined error margin $\Delta_n$ may be raised or the determination of the symbol rate may be aborted and/or an error message may be displayed on the display 22. In some embodiments, the determination of the symbol rate may be aborted and/or the error message may be displayed on the display 22 if the predefined error margin $\Delta_n$ is equal to or larger than 15%.

If in step S8 the coverage coefficient is determined to be bigger than the predefined threshold, the symbol rate of the input signal is determined based on the determined group pulse widths $UI_n$ (step S10).

In some embodiments, the symbol rate of the input signal is determined based on the group pulse widths $UI_n$ that are approximately an integer multiple of the smallest group pulse width $UI_0$, i.e. $UI_n \approx n \cdot UI_0 \pm \Delta_n$, or that are approximately an integer multiple of the divided smallest group pulse $UI'_0$ i.e. $UI_n \approx n \cdot UI'_0 \pm \Delta'_n$. In the following, $UI_0$ is understood to denote both $UI_0$ and $UI'_0$.

The average width $\tau_S$ of a symbol, measured in units of the smallest group pulse width $UI_0$, is determined by the following equation:

$$\tau_s = \frac{\sum_{n \geq 1}(\#_n \mid R_n \in [n - \Delta_n; n + \Delta_n]) \frac{UI_n}{n \cdot UI_0}}{\sum_{n \geq 1} \#_n \mid R_n \in [n - \Delta_n; n + \Delta_n]}.$$

Therein, the individual group pulse widths are divided by n to account for the fact that they are approximately an integer multiple of the smallest group pulse width $UI_0$. Moreover, the group pulse widths are weighted with the number of pulse widths contained in the respective group.

The symbol rate $f_S$, measured in units of the inverse of the smallest group pulse width $UI_0$, is then given by the inverse of the symbol rate, i.e. $f_S = 1/\tau_S$.

Alternatively, the average width of a symbol may be set to be equal to $\tau_S$. However, the measurements of the bigger group pulse widths are completely discarded in this approach, such that the accuracy of the determined symbol width $\tau_S$ and the corresponding symbol rate $f_S$ may be impaired.

It will be appreciated that one or more aspects of the methods set forth herein can be carried out in a computer system. In this regard, a program element is provided, which is configured and arranged when executed on a computer to determine a symbol rate of an input signal. In one embodiment, the program element may specifically be configured to perform the steps of: receiving said input signal; determining respective pulse widths of pulses contained in said input signal; allocating said pulse widths to groups based on a magnitude of the respective pulse widths; determining a group pulse width for each of the groups, said group pulse width being representative of the pulse widths contained in the respective group; and determining said symbol rate based on the determined group pulse widths. In other embodiments, the program element may be specifically configured to perform the steps of claims 2-12.

The program element may be installed in memory, such as computer readable storage medium. The computer readable storage medium may be any one of the computing devices, modules, instruments, oscilloscopes, analyzers, etc., described elsewhere herein or another and separate computing device, modules, instruments, oscilloscopes, analyzers, etc., as may be desirable. The computer readable storage medium and the program element, which may comprise computer-readable program code portions embodied therein, may further be contained within a non-transitory computer program product.

As mentioned, various embodiments of the present disclosure may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, optical disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. Other non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM) of any rate, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

The computer-readable media include cooperating or interconnected computer-readable media, which exist exclusively on a processing system or distributed among multiple interconnected processing systems that may be local to, or remote from, the processing system.

As should be appreciated, various embodiments of the present disclosure may be also implemented as methods, apparatus, systems, computing devices, computing entities, and/or the like, as have been described elsewhere herein or claimed below. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Various embodiments are described above with reference to block diagrams and/or flowchart illustrations of apparatuses, methods, systems, and computer program products. It should be understood that each block of any of the block diagrams and/or flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks and/or carry out the methods described herein.

These computer program instructions may also be stored in a computer-readable memory, such as the computer-readable storage media described above, that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks and/or carry out the methods described herein.

It will be appreciated that the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, could be implemented by special purpose hardware-based computer systems or circuits, etc., that perform the specified functions or operations, or combinations of special purpose hardware and computer instructions.

According to some embodiments, many individual steps of a process may or may not be carried out utilizing the computer systems described herein, and the degree of computer implementation may vary, as may be desirable and/or beneficial for one or more particular applications.

It should now be appreciated that some embodiments of the present disclosure, or portions thereof, have been described in the general context of computer code or machine-useable instructions, including computer-executable instructions such as program modules, being executed by a computing system, or other machine or machines. Some of these embodiments or others may be implemented using a variety of system configurations, including handheld devices, consumer electronics, general-purpose computers, more specialty computing devices, etc. Embodiments described herein may also be implemented in distributed computing environments, using remote-processing devices that are linked through a communications network or the Internet.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A symbol rate determination method for determining a symbol rate of an input signal, comprising:
  receiving said input signal;
  determining respective pulse widths of pulses contained in said input signal;
  allocating said pulse widths to groups based on a magnitude of the respective pulse widths;
  determining a group pulse width for each of the groups, said group pulse width being representative of the pulse widths contained in the respective group; and
  determining said symbol rate based on the determined group pulse widths.

2. The symbol rate determination method of claim 1, wherein a smallest one of the determined group pulse widths is compared to the remaining determined group pulse widths in order to determine said symbol rate.

3. The symbol rate determination method of claim 2, wherein a ratio of said smallest group pulse width and at least one of the remaining group pulse widths is determined, and wherein it is determined whether said ratio is equal to an integer within a predefined error margin.

4. The symbol rate determination method of claim 3, wherein the smallest group pulse width is divided by an integer number bigger than one if said ratio is a non-integer number, thereby obtaining a divided group pulse width, and wherein said divided group pulse width is compared to the remaining group pulse widths in order to determine said symbol rate.

5. The symbol determination method of claim 3, wherein a coverage coefficient is determined to be a quotient of a number of pulses whose allocated ratio is an integer and an overall number of pulses, wherein the symbol rate is determined based on said group pulse widths if the coverage coefficient is bigger than a predefined threshold.

6. The symbol rate determination method of claim 1, wherein the pulse widths are determined by determining signal edges in said input signal and by subtracting the associated times of each pair of two consecutive signal edges from each other.

7. The symbol rate determination method of claim 1, wherein the pulse widths of each group are averaged in order to determine the group pulse width.

8. The symbol rate determination method of claim 1, wherein a number of determined pulse widths contained in each of the groups is determined.

9. The symbol rate determination method of claim 8, wherein the group pulse widths are weighted with the respective number of pulse widths contained in the respective group in order to determine said symbol rate.

10. The symbol rate determination method of claim 1, wherein the determined pulse widths are sorted by size and a moving average of the sorted pulse widths is determined in order to allocate the pulse widths to said groups.

11. The symbol rate determination method of claim 1, wherein a perturbation filter is applied to the determined pulse widths that discards all pulse widths that are much smaller than a smallest of said group pulse widths.

12. The symbol rate determination method of claim 1, wherein the input signal is PAM-n coded.

13. A non-transitory computer readable medium comprising computer readable instructions which, when executed by one or more computing devices, cause the one or more computing devices to perform the method of claim 1.

14. A measurement instrument for determining a symbol rate of an input signal, comprising:
- at least one input channel and an analysis module being connected to the at least one input channel, wherein the measurement instrument being configured to receive an input signal via said input channel and to forward the input signal to the analysis module,
- wherein the analysis module is configured to
  - allocate said pulse widths to groups based on the magnitude of the respective pulse widths,
  - determine a group pulse width for each of the groups, said group pulse width being representative of the pulse widths contained in the respective group, and
  - determine said symbol rate based on the determined group pulse widths.

15. The measurement instrument of claim 14, wherein the analysis module is configured to determine whether a ratio of a smallest of the determined group pulse widths to one or more of the remaining group pulse widths is equal to an integer within a predefined error margin.

16. The measurement instrument of claim 15, wherein the analysis module is configured to determine a coverage coefficient, said coverage coefficient being defined as a quotient of a number of pulses whose allocated ratio is an integer and an overall number of pulses, and wherein the analysis module is configured to determine said symbol rate based on said group pulse widths if the coverage coefficient is bigger than a predefined coverage value.

17. The measurement instrument of claim 16, wherein the analysis module comprises a filter module being configured to filter out perturbations from the input signal.

18. The measurement instrument of claim 14, wherein the measurement instrument is established as at least one of an oscilloscope, a spectrum analyzer and a vector network analyzer.

* * * * *